UNITED STATES PATENT OFFICE 2,215,105

COLORING MATTERS FROM AZO DYESTUFFS

Hans Krzikalla, Ludwigshafen - on - the - Rhine, Germany, assignor to General Aniline & Film Corporation, a corporation of Delaware No Drawing. Application March 14, 1939, Serial No. 261,759. In Germany March 31, 1938

2 Claims. (Cl. 260—151)

The present invention relates to coloring matters from azo dyestuffs, more particularly certain amine salts of the complex chromium compound of the azo dyestuffs 4.6-dinitro-1-hydroxybenzene-azo-2-hydroxynaphthalene-4-sulfonic acid.

I have found that new coloring matters may be prepared which comprise the amine salts of the chromium compound of the azo dyestuff of the formula

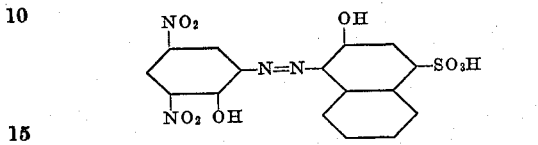

(obtainable by coupling diazotized picramic acid with 2-hydroxynaphthalene-4-sulfonic acid and treating with an agent supplying chromium) with an organic basic nitrogen compound which is water-insoluble but soluble in liquid paraffin hydrocarbons, such as benzine.

These new amine salts are substantially insoluble in water but they are easily soluble in many solvents used in the lacquer industry, such as alcohols, glycol alkyl ethers and in many cases even in butyl acetate. They are especially well suited for the preparation of bluish black cellulose ester or alkyd resin lacquers furnishing coatings distinguished by richness of shade and brightness on materials of all kinds. The coatings are fast to light and to weather and have a distinct advantage over other dyes ordinarily used in cellulose ester lacquers in that they are fast to overspraying.

The above general designation "organic basic nitrogen compound which is water-insoluble but soluble in liquid paraffin hydrocarbons" includes in particular primary, secondary and tertiary aliphatic and cycloaliphatic amines having at least 8 carbon atoms, such as straight-chain or branched-chain amines derived from paraffin hydrocarbons, e. g. diisoamyl amine, dodecylamine, stearylamine, dimethyloctodecylamine, dimethyl-palmkernel-fat-amine (prepared by methylation of the amine prepared from palm kernel fatty acids and representing a mixture of tertiary amines containing two methyl groups and one hydrocarbon radicle containing from 10 to 18 carbon atoms), or aliphatic amines containing olefinic linkages such as octodecenylamine, diethyloctodecenylamine and also cycloaliphatic amines having at least 8 carbon atoms such as N-ethylcyclohexylamine, or dicyclohexylamine. Although I prefer to employ aliphatic or cycloaliphatic amines, the invention is not limited thereto but includes the employment of other basic nitrogen compounds insoluble in water but soluble in benzine such as diphenyl- or ditolylguanidine. Mixtures of the amino compounds may also be used.

In preparing the coloring matters according to the present invention, a water-soluble salt of the chromium compound of the azo dyestuff 4.6-dinitro-1-hydroxybenzene-azo - 2 - hydroxynaphthalene-4-sulfonic acid is caused to react in aqueous solution with a salt of the amine, as for example the formic or acetic acid salt, the new coloring matters being precipitated out of solution. The free acid of the chromium-containing dyestuffs may also be reacted with the free bases in an organic solvent, as for example alcohol.

The following example will further illustrate how my invention may be carried out in practice but the invention is not restricted to this example. The parts are by weight.

Example 45 parts of the monoazo dyestuff prepared from diazotized picramic acid and 2-hydroxynaphthalene-4-sulfonic acid sodium salt are dissolved in 600 parts of water, 20 parts of a 26 per cent $Cr_2O_3$ containing paste and 10 parts of 85 per cent formic acid are added and the whole is heated until the chromium compound is formed. The chromium-containing dyestuff is salted out and dried.

The chromination may also be carried out under super-atmospheric pressure, for example by heating for several hours in a pressure-tight vessel at from 110 to 120° C. or in the presence of salt solutions, e. g. solutions of sodium chloride. Instead of chromium oxide and formic acid, there may be used other salts of trivalent chromium, for example the acetate, chloride, fluoride and the like or even freshly precipitated chromium oxide hydrate itself.

50 parts of the sodium salt of the complex chromium compound of the azo dyestuff derived from diazotized 4.6-dinitro-2-amino-1-hydroxybenzene and 2-hydroxynaphthalene - 4 - sulfonic acid are dissolved in water, mixed with an acetic acid solution of 26 parts of dimethyl-palm-kernel-acid-amine (prepared by methylation of the amine obtained from palm-kernel fatty acids) and heated to about 60° C. After cooling, the deposited precipitate is filtered off by suction and dried. The dyestuff is well soluble in particular in cellulose ester lacquers containing butyl acetate. Such solutions yield beautiful bluish black coatings fast to light and over-spraying on sheet metal or paper. A similar dyestuff is obtained when using dimethyldodecylamine instead of dimethyl-palm-kernel-fat-amine.

A similar dyestuff salt is obtained by admixing an alcoholic solution of the chromium compound with an alcoholic solution of dicyclohexylamine and evaporating the alcohol.

What I claim is:

1. The organic amine salt which is the reaction product of the chromium compound of the azo dyestuff 4.6 - dinitro - 1 - hydroxybenzene-azo- 2 - hydroxynaphthalene-4-sulfonic acid with an aliphatic amine having at least 8 carbon atoms.

2. The organic amine salt which is the reaction product of the chromium compound of the azo dyestuff 4.6 - dinitro- 1 -hydroxybenzene - azo-2- hydroxynaphthalene-4-sulfonic acid with an aliphatic tertiary amine containing 2 low molecular hydrocarbon radicles and one radicle of an aliphatic hydrocarbon containing from 10 to 18 carbon atoms.

HANS KRZIKALLA.